(12) United States Patent
Zheng et al.

(10) Patent No.: US 11,437,916 B2
(45) Date of Patent: Sep. 6, 2022

(54) ADAPTIVE ZERO VOLTAGE SWITCHING CONTROL

(71) Applicant: DIALOG SEMICONDUCTOR INC., Campbell, CA (US)

(72) Inventors: Cong Zheng, Campbell, CA (US); Wenduo Liu, Campbell, CA (US); Jianming Yao, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 16/903,204

(22) Filed: Jun. 16, 2020

(65) Prior Publication Data

US 2020/0403521 A1 Dec. 24, 2020

Related U.S. Application Data

(60) Provisional application No. 62/863,764, filed on Jun. 19, 2019.

(51) Int. Cl.
*H02M 3/335* (2006.01)
*H02M 1/00* (2006.01)

(52) U.S. Cl.
CPC ... *H02M 3/33592* (2013.01); *H02M 3/33523* (2013.01); *H02M 1/0058* (2021.05)

(58) Field of Classification Search
CPC ............. H02M 3/335; H02M 3/33507; H02M 3/33523; H02M 3/3353; H02M 3/33576; H02M 3/33592; H02M 3/33546; H02M 3/337; H02M 3/3372; H02M 3/3374; H02M 1/00; H02M 1/0058; H02M 2001/0003; H02M 2001/0058
USPC ..................... 363/21.01, 21.02, 21.03, 21.12
See application file for complete search history.

(56) References Cited

U.S. PATENT DOCUMENTS

| | | | | |
|---|---|---|---|---|
| 5,880,940 A | * | 3/1999 | Poon ........................ | H02M 1/34 363/20 |
| 6,426,883 B1 | * | 7/2002 | Stanley .................. | H02M 3/285 363/16 |
| 9,374,011 B2 | * | 6/2016 | Liu .................... | H02M 3/33515 |
| 2014/0185333 A1 | * | 7/2014 | Yang .................. | H02M 3/33569 363/21.12 |
| 2015/0124494 A1 | * | 5/2015 | Malinin ............ | H02M 3/33592 363/21.14 |

* cited by examiner

*Primary Examiner* — Yemane Mehari
(74) *Attorney, Agent, or Firm* — Haynes and Boone, LLP (57) ABSTRACT

A flyback converter is disclosed that includes an auxiliary switch controller that adaptively controls the auxiliary switch for improved zero voltage switching. The auxiliary switch control adaptively adjusts the auxiliary switch on-time period responsive to a transformer reset time for the flyback converter, a resonant oscillation period for a power switch terminal voltage for a power switch transistor, and an on-time period for the power switch transistor to provide the improved zero voltage switching.

16 Claims, 6 Drawing Sheets

ADAPTIVE ZERO VOLTAGE SWITCHING CONTROL

CROSS REFERENCE TO RELATED APPLICATIONS

The present application claims the benefit of U.S. Provisional Application No. 62/863,764, filed Jun. 19, 2019 and entitled "Adaptive Zero Voltage Switching Control" the contents of which is incorporated by reference herein.

TECHNICAL FIELD

This application relates to a flyback converter with adaptive zero voltage switching.

BACKGROUND

Isolated power converters such as a flyback converter are commonly used in both AC-to-DC and DC-to-DC conversion to provide galvanic isolation between an input power source and one or more outputs. The flyback converter is a buck-boost converter with the inductor split to form a transformer, allowing for both the scaling of the output voltage and primary-to-secondary isolation. To regulate the output voltage, a controller controls a cycling of a power switch transistor in series with the primary winding of the transformer. When the power switch transistor cycles off during a discontinuous conduction mode (DCM) operation, its drain voltage rises high. The drain voltage then declines until the transformer reset time, at which point the drain voltage resonantly oscillates.

The oscillating drain-to-source voltage across the power switch transistor stresses the power switch transistor when it is cycled back on. In addition, the associated switching losses lowers efficiency. To reduce the switching strain and improve efficiency, various zero voltage switching architectures have been developed. For example, an active-clamp capacitor and an active-clamp switch transistor may be coupled in series between the input voltage rail and the drain of the power switch transistor. After the power switch transistor cycles off, the active-clamp switch transistor is cycled on to inject a negative primary winding current into the primary winding so as to increase the amplitude of the drain voltage ringing. The switching on of the active-clamp switch transistor develops the negative current primary winding current such that when the active-clamp switch transistor cycles off, the drain voltage of the power switch transistor oscillates to zero volts. The power switch transistor may then be switched on at the zero-crossing of the drain voltage (zero drain-to-source voltage) so as to reduce switching stress and maximize efficiency.

In general, the amount of energy injected into the magnetizing inductance of the transformer to achieve zero voltage switching (ZVS) is proportional to the turn-on time period for the active-clamp switch transistor. But there is a tradeoff between the loss caused by the active-clamp switch transistor conduction and the loss savings from ZVS. Accordingly, there is a need in the art for switching power converters with dynamically-controlled zero voltage switching.

SUMMARY

An adaptive switch controller is disclosed for adaptively controlling the on-time period for an auxiliary switch transistor for zero voltage switching. The adaptive determination is responsive to the transformer reset time, the power switch transistor on-time period, and the resonant oscillation frequency (or period) of a terminal voltage of the power switch transistor. These factors are all readily measured using conventional techniques such that the adaptive determination may be advantageously performed as often as on a cycle-by-cycle basis. In this fashion, the zero-voltage switching of the power switch transistor is optimized as it adapts to various changing factors such as the input voltage, the output voltage, the output current, and parasitic elements.

These and other advantageous features may be better appreciated through the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
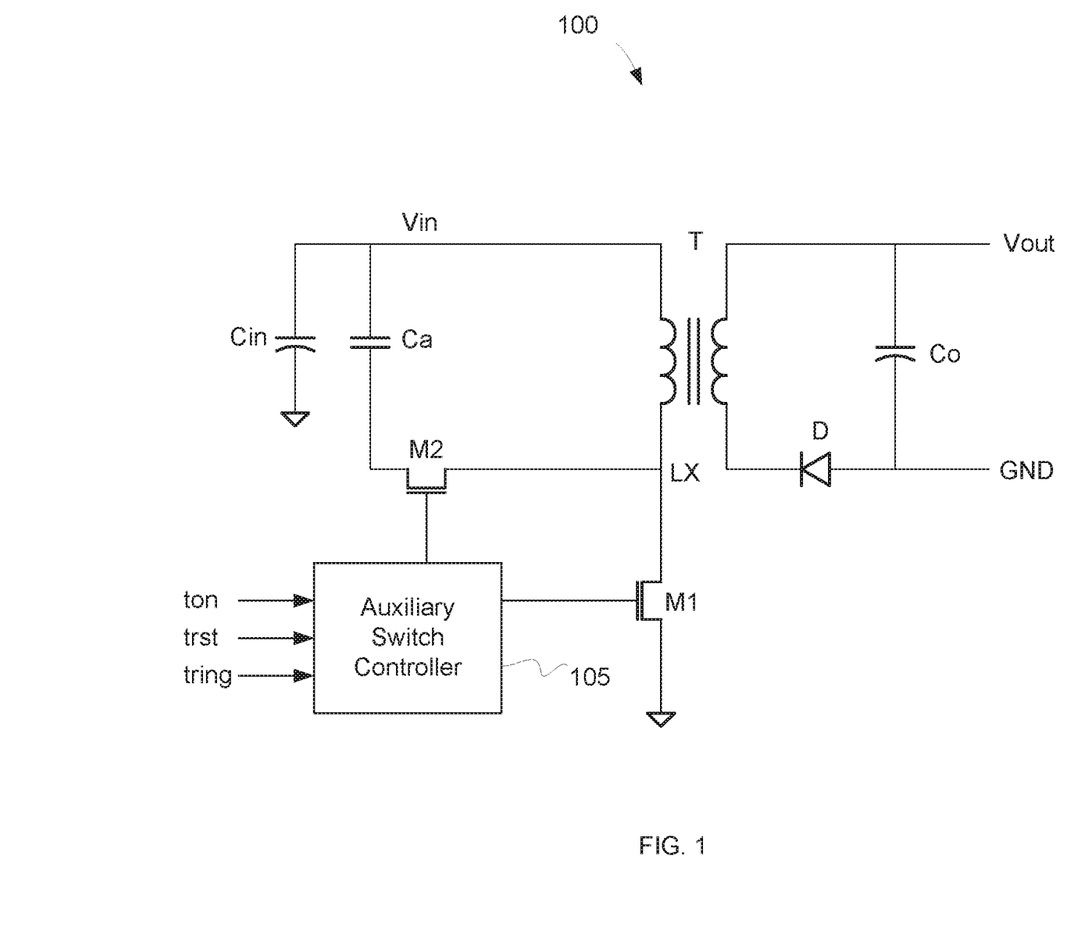
FIG. 1 illustrates an active-clamp flyback converter including an auxiliary switch controller for adaptively controlling an active-clamp switch transistor connected to the primary winding in accordance with an aspect of the disclosure.

The dynamically-controlled zero voltage switching disclosed herein may be utilized in any suitable ZVS architecture. Suitable ZVS architectures include an active-clamp flyback converter, a synchronous rectifier active clamp flyback converter, and an auxiliary winding ZVS flyback converter. An example active-clamp flyback converter 100 is shown in FIG. 1. A rectified input voltage Vin carried on an input voltage rail and supported by an input capacitor Cin drives a primary winding current into a primary winding of a transformer T when an NMOS power switch transistor M1 is switched on. While the primary current conducts during the on-time period for the power switch transistor M1, an output diode D prevents a secondary winding current from flowing. Alternatively, flyback converter 100 may use a synchronous rectifier switch in lieu of output diode D to synchronously rectify the secondary winding current. After the power switch transistor M1 switches off at an expiration of the on-time period of the power switch transistor M1, the secondary winding current flows to charge an output voltage Vout as supported by an output capacitor Co.

The drain of power switch transistor M1 (which is also the switching node LX) couples through an NMOS active-clamp transistor M2 to an active-clamp capacitor Ca that also is connected to the input voltage rail. Active-clamp transistor M2 may also be denoted as an auxiliary switch transistor. An auxiliary switch controller 105 dynamically controls the on-time period for active clamp transistor M2 responsive to the on-time (ton) period for power switch transistor M1, the transformer reset time (trst), and the period (tring) for the resonant oscillation of the drain voltage LX. The use of these input variables in switch controller 105 is discussed further below. Auxiliary switch controller 105 also functions as a controller of the power switch transistor M1 although the control of the auxiliary switch transistor and the power switch transistor M1 may be performed in separate controller circuits in alternative embodiments.

Figure 2:
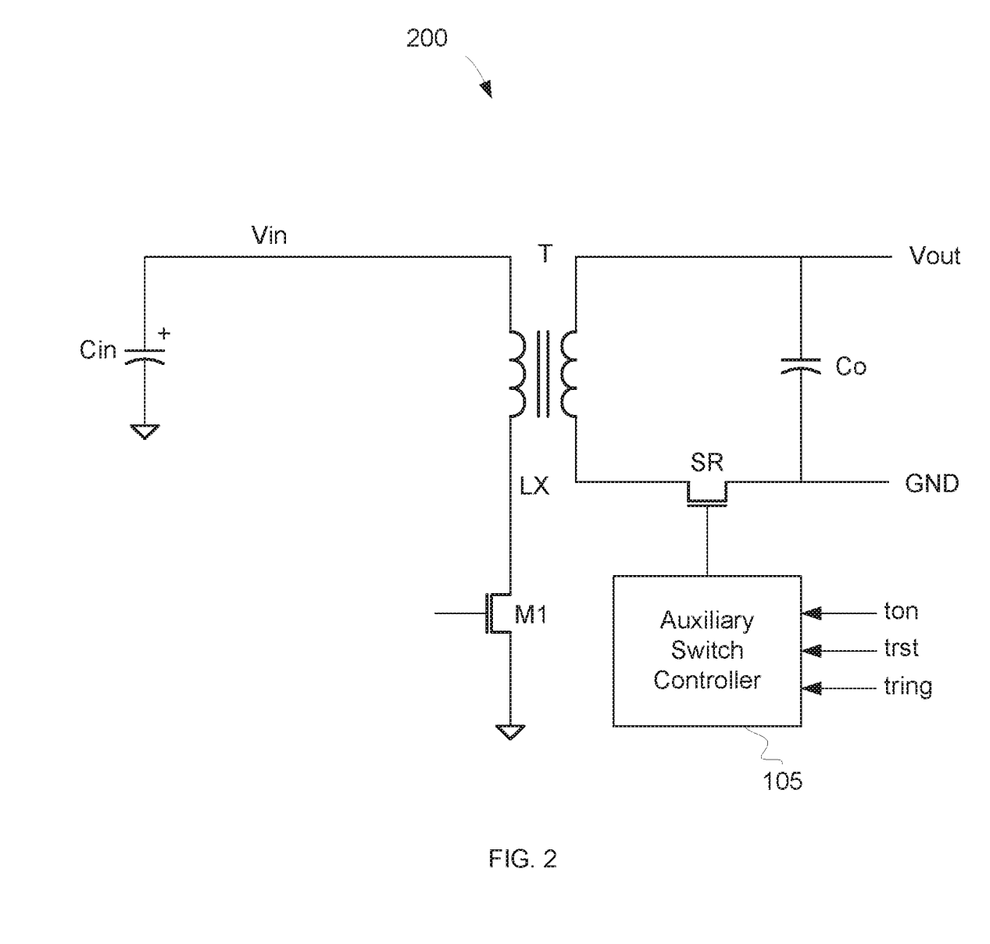
FIG. 2 illustrates a flyback converter in which the synchronous rectifier switch transistor functions as the auxiliary switch transistor for zero voltage switching in accordance with an aspect of the disclosure.

A synchronous rectifier switch transistor may also be used to form the auxiliary switch transistor that is controlled by auxiliary switch controller 105. An example synchronous rectifier flyback converter 200 is shown in FIG. 2. Output diode D is replaced by a synchronous rectifier (SR) switch transistor. As known in the synchronous rectifier arts, an SR controller (in this embodiment, auxiliary switch controller 105) controls the SR switch transistor to be off while the power switch transistor M1 conducts. When the power switch transistor M1 switches off, auxiliary switch controller 105 switches on the SR switch transistor so that the secondary current can flow from its peak to zero during a discontinuous conduction mode of operation. The delay from the switching off of the power switch transistor M1 to when the secondary winding current reaches zero is known as the transformer reset time (trst). In a conventional flyback converter with synchronous rectification, the SR switch transistor would then remain off until the power switch transistor M1 was again cycled on and off. Auxiliary switch controller 105 exploits the SR switch transistor during this null period for the power switch transistor M1 so that the SR switch transistor functions as an auxiliary switch transistor for zero voltage switching using an on-time period that is determined as discussed regarding flyback converter 100.

Figure 3:
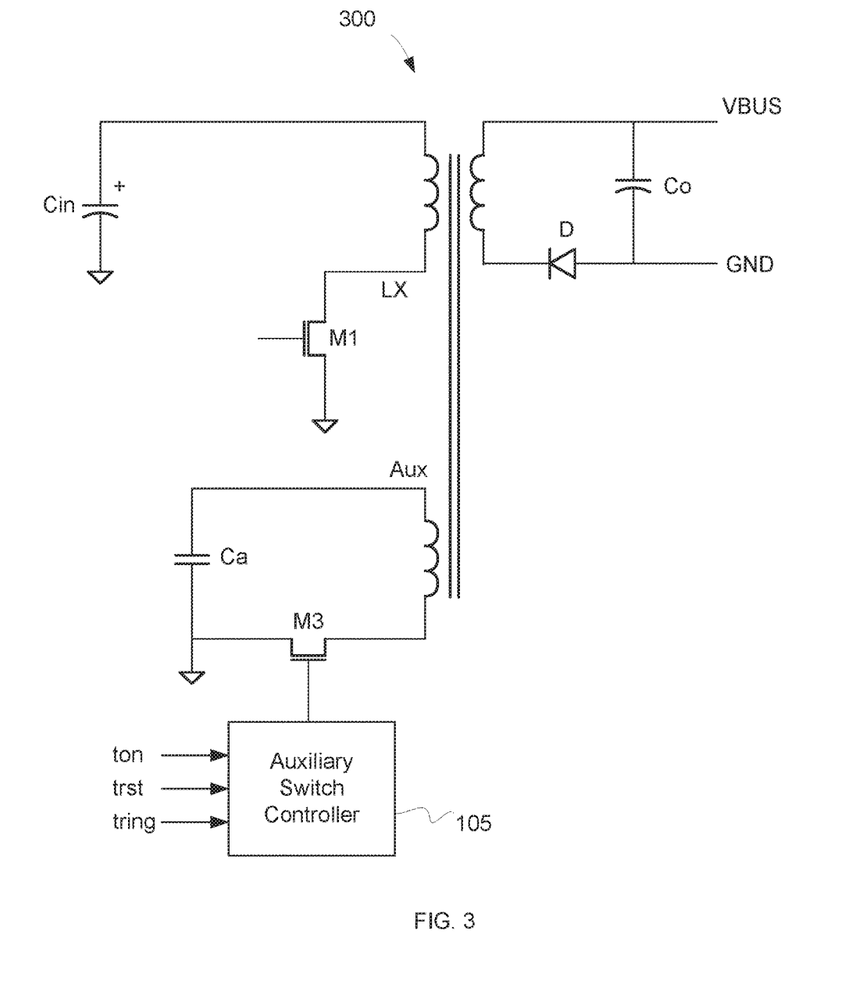
FIG. 3 illustrates an active-clamp flyback converter including an auxiliary switch controller for adaptively controlling an active-clamp switch transistor connected to the auxiliary winding in accordance with an aspect of the disclosure.

The auxiliary switch transistor may also be connected to an auxiliary winding for zero voltage switching. An example auxiliary winding ZVS flyback converter 300 is shown in FIG. 3. An auxiliary switch transistor M3 and an active clamp capacitor Ca are in series with the auxiliary winding (Aux) of the transformer. A source of the auxiliary switch transistor M3 is connected between ground and an output terminal for the auxiliary winding. The active clamp capacitor Ca connects between ground and an input terminal for the auxiliary winding. Auxiliary switch controller 105 controls the on-time period of auxiliary switch transistor M3 as discussed with regard to flyback converter 100. In flyback converter 300, the rectified input voltage Vin as carried on an input voltage rail and as supported by the input capacitor Cin drives a primary winding current into the primary winding of the transformer T when the NMOS power switch transistor M1 is switched on. While the primary current conducts, the output diode D prevents a secondary winding current from flowing. Alternatively, flyback converter 300 may use a synchronous rectifier switch in lieu of output diode D to synchronously rectify the secondary winding current. After the power switch transistor M1 switches off, the secondary winding current flows to charge an output voltage Vout as supported by an output capacitor Co.

Regardless of the zero voltage switching topology, auxiliary switch controller 105 adaptively controls the on-time period of the auxiliary switch for optimal zero voltage switching. The auxiliary switch controller 105 may comprise a logic circuit such as an application-specific integrated circuit (ASIC) for performing the calculations disclosed herein to implement this adaptive control. The adaptive control adapts to the amplitude and frequency of the resonant oscillation of the drain voltage for the power switch transistor M1. The amplitude and frequency of the resonant oscillation depends upon operating conditions such as the input voltage, the output voltage, the load current, temperature, and parasitic elements. The parasitic capacitance of power switch transistor M1 and the leakage inductance of the transformer are especially dominant factors. But these parasitic elements vary widely from device to device. The varying behavior of the resonant oscillation rendered conventional zero voltage switching techniques less than satisfactory. In contrast, auxiliary switch controller 105 adapts the zero voltage switching to the actual resonant oscillation period to improve zero voltage switching performance. In addition, auxiliary switch controller 105 adapts the on-time period of the auxiliary switch transistor to control the amount of energy stored in the transformer during the on-time period for the auxiliary switch transistor. It is advantageous to balance the auxiliary switch transistor conduction loss as compared to the power savings from zero voltage switching based upon the operating conditions by adapting the auxiliary switch transistor on-time period as disclosed herein.

The adaptive control of the auxiliary switch transistor on-time period is based upon a function of the transformer magnetizing inductance Lm, the parasitic capacitance Cp, and a ratio Vin/(Nps*Vout), where Vin is the input voltage, Vout is the output voltage, Nps is the primary-to-secondary turn ratio for the transformer. The functional dependence on the magnetizing inductance Lm and the parasitic capacitance Cp can be expressed as a function of the ringing period Tring. It can thus be shown that the on time (Ton_aux) for the auxiliary switch is given by the following first function:

$$Ton\_aux = A*Trst/Ton*(B*Tring+C)$$

where Ton is the on-time period for the power switch transistor M1. A, B, and C are coefficients that can be solved for using conventional differential equation techniques. In particular, the resonant oscillation period Tring depends upon the transformer magnetizing inductance Lm and the parasitic capacitance Cp. Based upon this resonant oscillation, the turn ratio Nps of the transformer, and the on-time Ton, the coefficients A, B, and C may be calculated so that the on-time Ton_aux of the auxiliary switch transistor injects the appropriate amount of energy (neither too much nor too little) to discharge the drain of the power switch transistor to zero volts.

The determination of the transformer reset time is well known in the flyback arts. Similarly, Tring is readily measured. Once the auxiliary switch transistor on-time period is determined, the auxiliary switch transistor off time may be indirectly determined by a determination of a dead time period (Twdg) between the auxiliary switch transistor off time and the subsequent switching on of the power switch transistor M1. It may be shown that the dead time period Twdg is given by the following second function:

$$Twdg = (D+E*Tring/Ton\_aux)*(F*Tring+G)$$

where D, E, F, and G are coefficients that can be solved for using conventional differential equation techniques. The determination of auxiliary switch transistor on-time period and the dead time period is readily described using Verilog or other conventional hardware description languages (HDL). Auxiliary switch controller 105 may thus be implemented by a subsequent conversion of the HDL coding into logic gates such as implemented in an ASIC. Alternatively, auxiliary switch controller 105 may comprise a microcontroller configured to calculate the first and second functions discussed above.

Figure 4A:
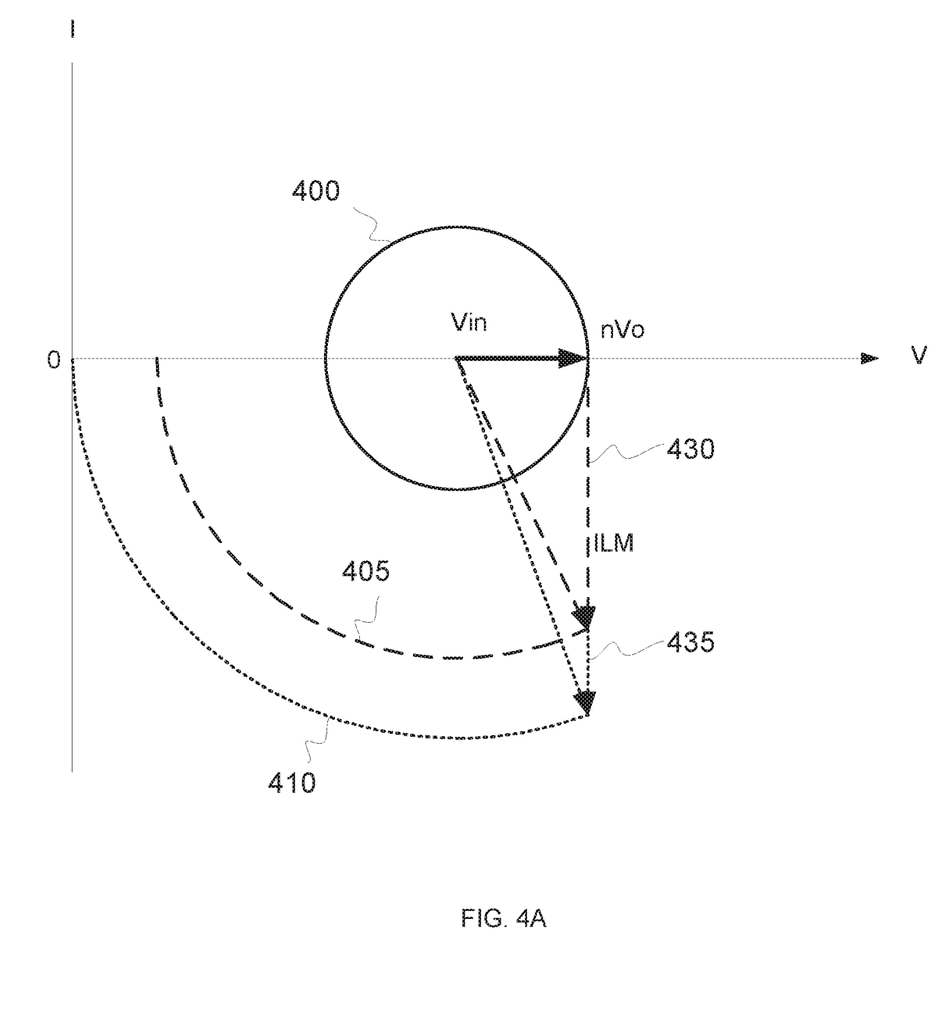
FIG. 4A illustrates some resonant tank waveforms to show the effect of various amounts of negative primary winding current injection in accordance with the zero voltage switching disclosed herein.

As the duration of the auxiliary switch transistor on-time period Ton_aux increases, more energy is stored in the magnetizing inductance Lm, which then functions to discharge the drain voltage of the power switch transistor more strongly. The energy in the resonant tank circuit formed by the magnetizing inductance Lm and the parasitic capacitance Cp of the power switch transistor is illustrated in FIG. 4A. The capacitive energy in the resonant tank is represented by the voltage V whereas the magnetic energy is represented by the current I. Without any auxiliary switching (the on-time period Ton_aux being zero), the voltage will oscillate from a value Vin+nVo to Vin−nVo, where n is the turns ratio, Vin is the input voltage, and Vo is the output voltage. As the energy in the resonant tank oscillates, the voltage will thus sinusoidally oscillate about the stable point Vin with an amplitude of nVo as shown by curve 400. The current will similarly oscillate about a stable point of zero current in curve 400.

Figure 4B:
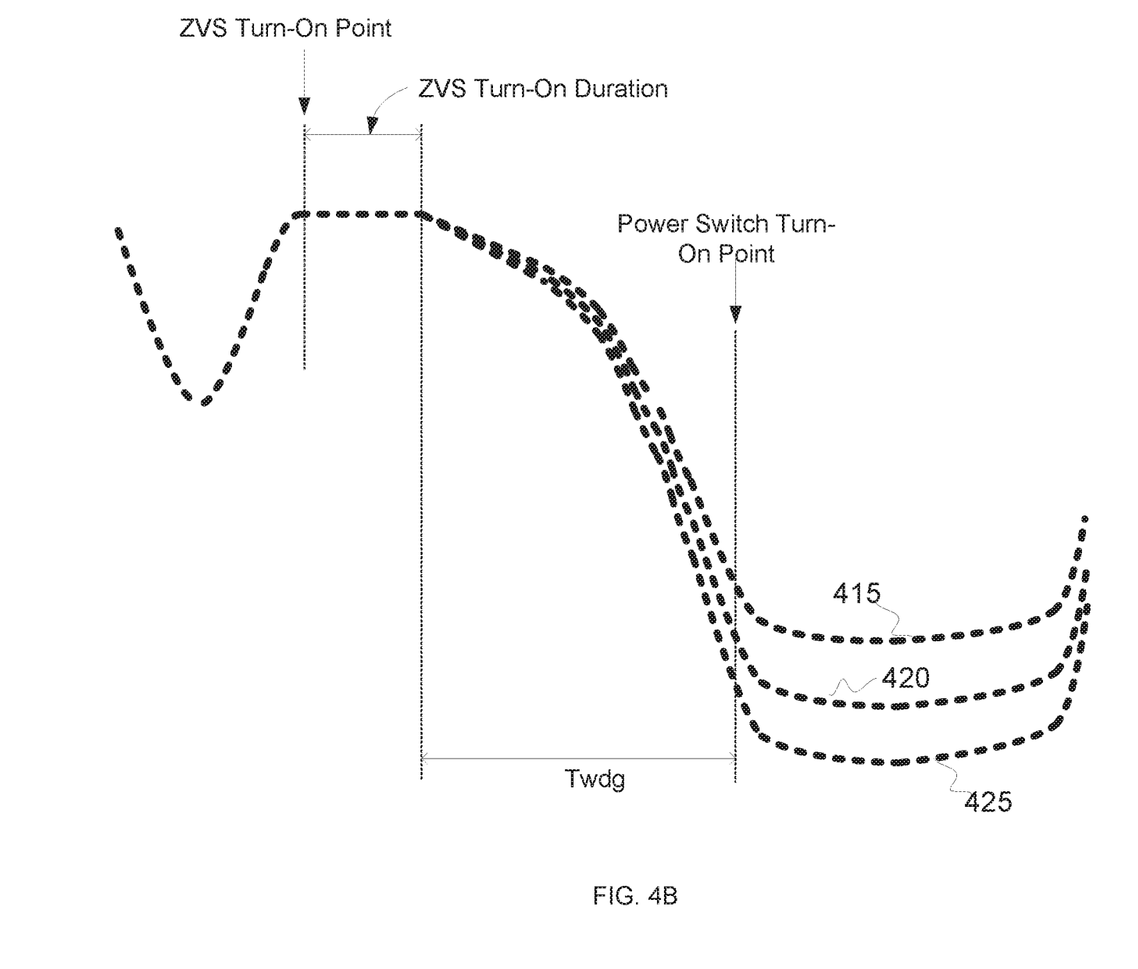
FIG. 4B illustrates some drain voltage waveforms resulting from the various amounts of negative primary winding current injection of FIG. 4A.

A drain voltage waveform 415 for the power switch transistor is shown in FIG. 4B for when the resonant tank circuit oscillates according to curve 400. The drain voltage is appreciable at the power switch turn-on point such that substantial switching stress and efficiency losses occur. To reduce the stress and switching loss, the on-time period Ton_aux is increased from zero so that negative primary winding current is injected into the resonant tank circuit. For example, if the auxiliary switch transistor is switched on for a first on-time period so as to inject a negative primary winding current 430 as shown in FIG. 4A, a curve 405 for the resonant oscillation between the capacitive and magnetic energy results in the resonant tank circuit. This injection of the negative primary winding current 430 results in a drain voltage waveform 420 as shown in FIG. 4B. Although the drain voltage of the power switch transistor is reduced at the power switch turn-on point, it is still positive. To further reduce the drain voltage, a larger negative drain current (ILM) 435 may be injected using a large on-time period as shown in FIG. 4A that results in a curve 410 for the resonant oscillation between the capacitive and the magnetic energy in the resonant tank circuit. Note that the voltage for the resonant tank circuit oscillates down to zero in curve 410. The injection of the negative primary winding current 435 thus results in a drain voltage waveform 425 as shown in FIG. 4B in which the drain voltage drops to zero at the power switch on-time point. The resulting optimal auxiliary switch transistor on-time and the optimal dead time period Twdg for waveform 425 are also illustrated in FIG. 4B. Referring again to FIG. 4A, the radius of optimal curve 410 is Vin. In turn, it may be seen that Vin equals the square root of (nVo² and ILM²). The determination of the coefficients for the calculation of the on-time period Ton_aux and the dead time period Twdg may thus be such that the appropriate amount of negative primary winding current ILM is obtained. The resulting calculations are quite advantageous in that they do not require any characterization of the magnetizing inductance and the parasitic capacitance but instead rely upon the easily measured factors of the power switch transistor on-time period Ton, the transformer reset time trst, and the resonant oscillation period tring.

Figure 5:
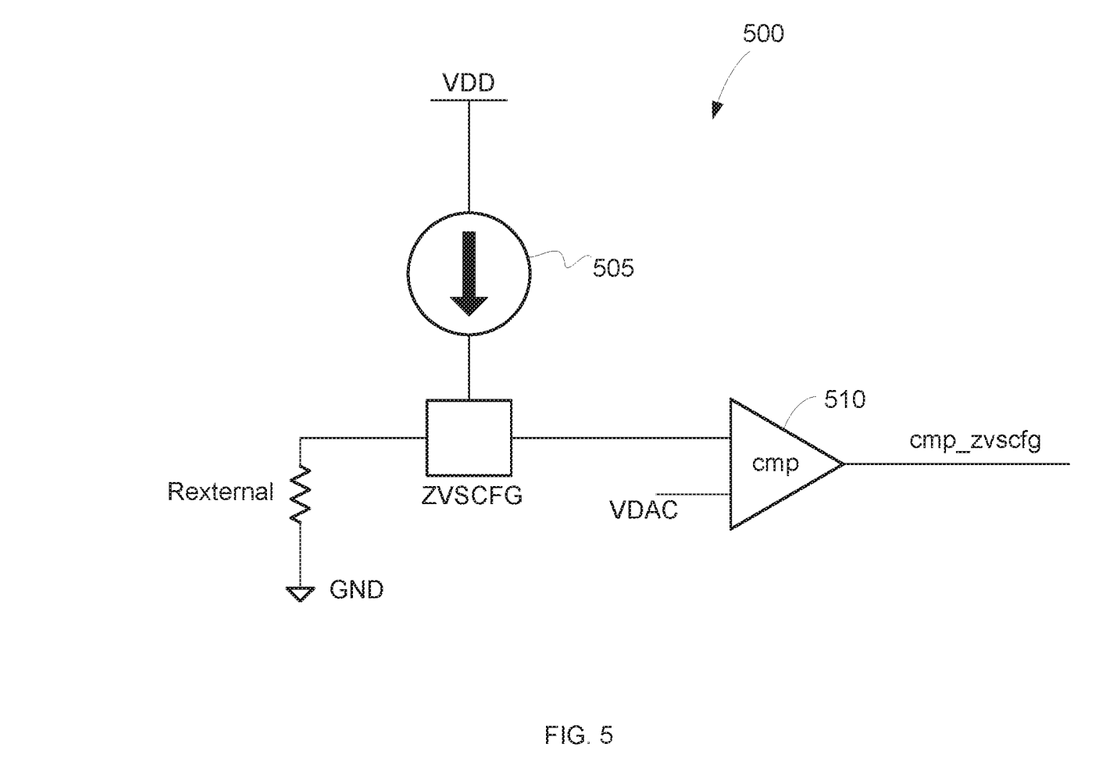
FIG. 5 illustrates a circuit for configuring an offset for the auxiliary switch transistor on-time period.

To provide additional flexibility with regard to accommodating different system parameters and operation conditions, a programable offset may be used to adjust the ZVS switch turn on duration. As shown in FIG. 5, a user may select an external resistor Rexternal that is connected to a ZVS configuration (ZVSCG) pin for an integrated circuit controller 500. A user may configure the ZVS determination by selecting the resistance for resistor Rexternal. Controller 500 includes a fixed current source 505 that drives a current I through resistor Rexternal to generate a voltage for a comparator 510. By adjusting a DAC voltage input to comparator 510, controller 500 maps the resistance value to an on-time offset Ton_aux_offset. A final value (Ton_aux_final) for the auxiliary switch transistor on-time thus equals Ton_aux+Ton_aux_offset. In this fashion, the adaptive calculation of the auxiliary switch on-time period may be offset by the user as desired.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A flyback converter, comprising:
a power switch transistor;
an auxiliary switch transistor for zero voltage switching in the flyback converter; and
an auxiliary switch controller for adaptively controlling an auxiliary switch on-time period in which the auxiliary switch transistor is switched on, wherein the auxiliary switch controller is further configured to determine a ratio of a transformer reset time for the flyback converter to an on-time period of the power switch transistor and determine a product of the first ratio with a resonant oscillation period for a power switch terminal voltage of the power switch transistor, and wherein the auxiliary switch controller is further configured to determine the auxiliary switch on-time period responsive to a function of the product.

2. The flyback converter of claim 1, wherein the first function is a first differential equation and wherein the auxiliary switch controller is further configured to determine an auxiliary switch dead period using a second differential equation.

3. The flyback converter of claim 1, wherein the auxiliary switch transistor is an active-clamp switch transistor connected to a primary winding of a transformer in the flyback converter.

4. The flyback converter of claim 1, wherein the auxiliary switch transistor is a synchronous rectifier switch transistor connected to a secondary winding of a transformer in the flyback converter.

5. The flyback converter of claim 1, wherein the auxiliary switch transistor is connected to an auxiliary winding of a transformer in the flyback converter.

6. The flyback converter of claim 1, wherein the auxiliary switch controller comprises an application specific integrated circuit.

7. A method of controlling an auxiliary switch transistor for zero voltage switching in a flyback converter comprising:

determining a first ratio of a transformer reset time for the flyback converter to an on-time period of a power switch transistor in the flyback converter;

determining a first product of the first ratio with a resonant oscillation period for a power switch terminal voltage for the power switch transistor;

determining an auxiliary switch transistor on-time period for the auxiliary switch transistor responsive to a first function of the first product; and switching on the auxiliary switch transistor for the auxiliary switch transistor on-time period to inject a negative primary winding current into a transformer of the flyback converter to cause a drain-to-source voltage of the power switch transistor to discharge to zero volts; and switching on the power switch transistor when a drain-to-source voltage for the power switch transistor is substantially discharged to zero volts.

8. The method of claim 7, further comprising:

determining a dead time period for the auxiliary switch transistor responsive to a second function of the auxiliary switch transistor on-time period and the resonant oscillation period, wherein the switching on of the power switch transistor occurs at an expiration of the dead time period.

9. The method of claim 8, wherein the auxiliary switch transistor on-time period is followed by the dead time period.

10. The method of claim 8, wherein the second function uses a second ratio of the resonant oscillation period and the auxiliary switch transistor on-time period.

11. The method of claim 10, wherein the second function further uses a second product of the second ratio and the resonant oscillation period.

12. The method of claim 7, wherein the switching on the auxiliary switch transistor for the auxiliary switch transistor on-time period comprises switching on an active-clamp transistor connected to a primary winding of the flyback converter.

13. The method of claim 7, wherein the switching on the auxiliary switch transistor for the auxiliary switch transistor on-time period comprises switching on an active-clamp transistor connected to an auxiliary winding of the flyback converter.

14. The method of claim 7, wherein the switching on the auxiliary switch transistor for the auxiliary switch transistor on-time period comprises switching on a synchronous rectifier switch transistor connected to a secondary winding of the flyback converter.

15. The method of claim 7, further comprising:
offsetting the auxiliary switch transistor on-time period by an offset.

16. The method of claim 15, further comprising:
driving a current into a resistor to develop a resistor voltage; and
comparing the resistor voltage to a reference voltage to determine the offset.

* * * * *